US008844343B2

(12) United States Patent
Kim

(10) Patent No.: US 8,844,343 B2
(45) Date of Patent: Sep. 30, 2014

(54) APPARATUS FOR DIAGNOSING EXHAUST GAS RECIRCULATION AND METHOD THEREOF

(75) Inventor: Seungbum Kim, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 182 days.

(21) Appl. No.: 13/490,788

(22) Filed: Jun. 7, 2012

(65) Prior Publication Data

US 2013/0145830 A1 Jun. 13, 2013

(30) Foreign Application Priority Data

Dec. 7, 2011 (KR) ........................ 10-2011-0130581

(51) Int. Cl.
*G01M 15/10* (2006.01)

(52) U.S. Cl.
USPC ........................................................ 73/114.74

(58) Field of Classification Search
USPC ............... 73/114.37, 114.69, 114.74, 114.76, 73/114.77
See application file for complete search history.

(56) References Cited

U.S. PATENT DOCUMENTS

| | | | | |
|---|---|---|---|---|
| 5,368,005 | A * | 11/1994 | Kako | 123/568.16 |
| 5,542,400 | A * | 8/1996 | Matsumoto et al. | 123/568.16 |
| 6,044,826 | A * | 4/2000 | Bayerle et al. | 123/568.16 |
| 6,164,270 | A * | 12/2000 | Bidner et al. | 123/568.16 |
| 6,508,111 | B2 * | 1/2003 | Osaki et al. | 73/114.74 |
| 6,598,470 | B2 * | 7/2003 | Ludwig et al. | 73/114.74 |
| 6,655,200 | B2 * | 12/2003 | Osaki et al. | 73/114.74 |
| 6,779,390 | B2 * | 8/2004 | Osaki et al. | 73/114.74 |
| 7,100,586 | B2 * | 9/2006 | Matsumoto | 123/568.16 |
| 7,104,259 | B2 * | 9/2006 | Terada | 123/568.16 |
| 7,881,858 | B2 * | 2/2011 | Kress et al. | 701/107 |
| 2001/0035172 | A1 * | 11/2001 | Osaki et al. | 123/568.16 |
| 2002/0033045 | A1 * | 3/2002 | Ludwig et al. | 73/117.2 |
| 2003/0106367 | A1 * | 6/2003 | Osaki et al. | 73/118.2 |
| 2003/0106368 | A1 * | 6/2003 | Osaki et al. | 73/118.2 |
| 2005/0199050 | A1 * | 9/2005 | Matsumoto | 73/117.3 |
| 2005/0199216 | A1 * | 9/2005 | Matsumoto | 123/396 |

FOREIGN PATENT DOCUMENTS

| | | | |
|---|---|---|---|
| JP | 08-200533 | A | 8/1996 |
| JP | 2010-180723 | A | 8/2010 |

* cited by examiner

*Primary Examiner* — Eric S McCall
(74) *Attorney, Agent, or Firm* — Morgan, Lewis & Bockius LLP

(57) ABSTRACT

An exhaust gas recirculation diagnosis device may include an EGR module that supplies an intake manifold with exhaust gas from an exhaust manifold, a MAP (manifold absolute pressure) sensor that measures pressure of the intake manifold, and a control portion that controls the EGR module such that the flow rate of the exhaust gas that is supplied from the exhaust manifold to the intake manifold is controlled by stages and monitors the value of the MAP sensor in a fuel cut off condition to diagnose whether the EGR module is faulty. The exhaust gas recirculation diagnosis device uses MAP sensor to perform exhaust gas recirculation and to diagnose the fault of the exhaust gas recirculation device.

10 Claims, 4 Drawing Sheets

APPARATUS FOR DIAGNOSING EXHAUST GAS RECIRCULATION AND METHOD THEREOF

CROSS-REFERENCE TO RELATED APPLICATION

The present application claims priority of Korean Patent Application Number 10-2011-0130581 filed Dec. 7, 2011, the entire contents of which application is incorporated herein for all purposes by this reference.

BACKGROUND OF INVENTION

1. Field of Invention

The present invention relates to an exhaust gas recirculation diagnosis device and an exhaust gas recirculation diagnosis method. More particularly, the present invention relates to an exhaust gas recirculation diagnosis device and exhaust gas recirculation diagnosis method using a MAP (manifold absolute pressure) sensor.

2. Description of Related Art

A large amount of harmful components such as CO, HC, and NOx (nitrogen oxides) is included in exhaust gas of an engine. Particularly, a high combustion temperature of the engine increases NOx generation, and therefore it is necessary to reduce the combustion temperature of the engine so as to reduce the NOx of the exhaust gas.

One main factor causing the combustion temperature of the engine to be raised is that the faster the spread of fire in a condition in which the density of the fuel mixture in a combustion chamber is high, the higher the temperature is, thereby raising the combustion temperature of the engine.

There is an exhaust gas recirculation (EGR) method that reduces the combustion temperature of the engine so as to reduce the NOx amount of the exhaust gas, wherein some of the exhaust gas is recirculated to the combustion chamber through intake air to deteriorate the density of the air/fuel mixture without changing the air/fuel ratio of the mixture, and therefore the combustion temperature of the engine is dropped.

The exhaust gas recirculation method reduces the NOx amount of the exhaust gas and improves fuel consumption efficiency of the engine. The use of the exhaust gas recirculation method reduces the temperature of the combustion chamber to reduce the NOx amount and simultaneously advances the ignition timing to avoiding knocking. Accordingly, engine output is improved and the fuel consumption efficiency is improved.

In the exhaust gas recirculation method, an EGR valve is used to control the amount of recirculated exhaust gas. If the EGR valve is fixed in an opened state, or is fixed in a closed state, the exhaust gas is not normally recirculated. If the EGR valve is fixed in an opened state, engine output is deteriorated and an engine surge can be generated. If the EGR valve is fixed in a closed state, the exhaust gas is not supplied to the combustion chamber, the combustion chamber temperature is not reduced, and the engine output is not improved. In addition, the exhaust gas can be abnormally recirculated by various causes such as a fault of a vacuum hose or a solenoid valve operating the EGR valve.

If the exhaust gas is not normally recirculated because of a fault of the exhaust gas recirculation device, the engine generates exhaust gas including a large amount of NOx. Therefore, it is necessary to diagnose the fault of the exhaust gas recirculation device and inform a driver of the fault.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for an exhaust gas recirculation diagnosis device and exhaust gas recirculation diagnosis method having advantages of circulating exhaust gas and diagnosing a fault of the exhaust gas recirculation device.

Various aspects of the present invention provide for exhaust gas recirculation diagnosis device that may include an EGR module that supplies an intake manifold with exhaust gas from an exhaust manifold, a MAP (manifold absolute pressure) sensor that measures pressure of the intake manifold, and a control portion that controls the EGR module such that the flow rate of the exhaust gas that is supplied from the exhaust manifold to the intake manifold is controlled by stages and monitors the value of the MAP sensor in a fuel cut off condition to diagnose whether the EGR module is faulty.

The EGR module may include an EGR pipe that connects the exhaust manifold with the intake manifold, an EGR valve that is disposed on the EGR pipe to control the flow rate of the exhaust gas that is supplied to the intake manifold from the exhaust manifold, and an operating portion that is controlled by the control portion to operate the EGR valve.

The control portion may obtain a first MAP sensor value in a first section where the EGR valve is closed, obtain a second MAP sensor value in a second section where the EGR valve is opened until a first point, obtain a third MAP sensor value in a third section where the EGR valve is opened until a second point, and obtain a fourth MAP sensor value in a fourth section where the EGR valve is closed.

The control portion may determine that an exhaust gas flow is normally controlled by the EGR module if the first MAP sensor value is equal to the fourth MAP sensor value.

The control portion may determine that an exhaust gas flow is abnormally controlled by the EGR module if the first MAP sensor value is not equal to the second MAP sensor value and at least one of the second MAP sensor value and the third MAP sensor value exceeds a predetermined normal range.

The control portion may shut off the EGR valve when it is determined that exhaust gas is abnormally controlled by the EGR module.

Various aspects of the present invention provide for an exhaust gas recirculation diagnosis method that may include closing an EGR valve during a fuel cut off condition and obtaining a first MAP sensor value indicating pressure of an intake manifold, opening the EGR valve to a first point and obtaining a second MAP sensor value indicating pressure of the intake manifold, closing the EGR valve and obtaining a fourth MAP sensor value indicating pressure of the intake manifold, and comparing the first MAP sensor value with the fourth MAP sensor value and determining whether the EGR valve normally controls exhaust gas recirculation.

The exhaust gas recirculation diagnosis method may further include determining whether the second MAP sensor value is between a maximum MAP sensor value and a minimum MAP sensor value according to an opening rate of the EGR valve that is opened to the first point.

The exhaust gas recirculation diagnosis method may further include opening the EGR valve to a second point and obtaining a third MAP sensor value indicating pressure of the intake manifold.

The exhaust gas recirculation diagnosis method may further determining whether the third MAP sensor value is between a maximum MAP sensor value and a minimum MAP sensor value according to the opening rate of the EGR valve that is opened to the second point.

The determining whether the EGR valve normally controls exhaust gas recirculation may include determining that the EGR valve normally controls the exhaust gas recirculation if the first MAP sensor value is equal to the second MAP sensor value.

The determining whether the EGR valve normally controls exhaust gas recirculation may include determining that the EGR valve abnormally controls the exhaust gas recirculation if the first MAP sensor value is not equal to the second MAP sensor value and at least one of the second MAP sensor value and the third MAP sensor value exceeds a maximum MAP sensor value or a minimum MAP sensor value.

The exhaust gas recirculation diagnosis method may further include closing the EGR valve if it is determined that the EGR valve abnormally controls the exhaust gas recirculation.

The exhaust gas recirculation diagnosis device uses a MAP sensor to perform exhaust gas recirculation and to diagnose a fault of the exhaust gas recirculation device.

Also, the exhaust gas recirculation diagnosis device does not necessarily use a separate flow sensor for diagnosing the fault of the exhaust gas recirculation device to save cost.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figure 1:
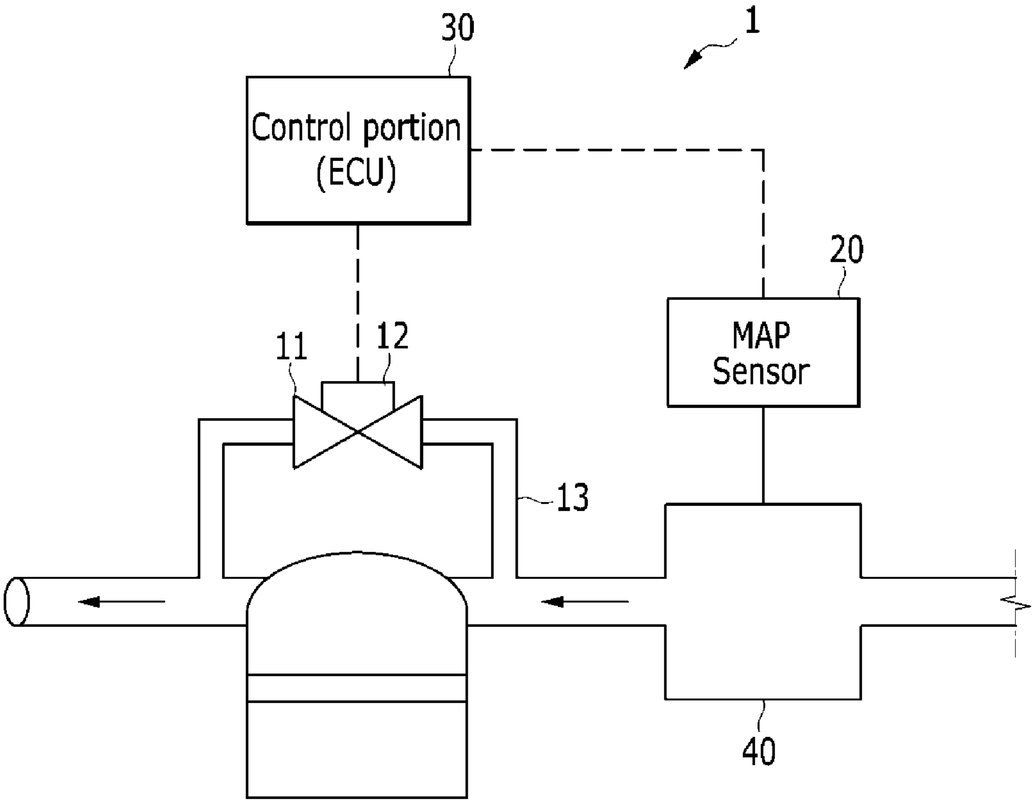
FIG. 1 is a block diagram schematically showing an exemplary exhaust gas recirculation diagnosis device according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Parts unrelated to the description are not described in order to describe the present invention more clearly, and the same or similar constituent elements are designated by the same reference numerals herein.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

FIG. 1 is a block diagram schematically showing an exhaust gas recirculation diagnosis device according to various embodiments of the present invention.

Referring to FIG. 1, an exhaust gas recirculation diagnosis device 1 includes an EGR (exhaust gas recirculation) module, a MAP (manifold absolute pressure) sensor 20, and control portion 30.

The EGR module includes an EGR valve 11, an electric operating portion 12, and an EGR pipe 13. The EGR valve 11 controls the amount of exhaust gas that is supplied to an intake manifold from an exhaust manifold. The electric operating portion 12 operates the EGR valve 11 by the control of the control portion 30. The EGR pipe 13 connects the exhaust manifold with the intake manifold and the EGR valve 11 is disposed on the middle portion of the EGR pipe 13. The EGR module supplies the exhaust gas of the exhaust manifold to the intake manifold. The electric operating portion 12 uses a solenoid to operate the EGR valve 11. Also, the electric operating portion 12 uses a DC motor type to operate the EGR valve 11.

The MAP sensor 20 measures the pressure of the intake manifold. The MAP sensor 20 can be disposed in a surge tank 40 that is disposed near the intake manifold to measure the pressure of the surge tank 40. The MAP sensor 20 transfers the MAP sensor value indicating the pressure of the intake manifold to the control portion 30.

The surge tank 40 enables the air or mixed fuel that is sucked through the inlet to be uniformly supplied to the combustion chamber of the engine.

The control portion 30 can be an ECU (engine control unit) that controls the overall operations of the engine. The control portion 30 controls the opening rate of the EGR valve 11 according to the temperature of the combustion chamber of the engine, a vehicle speed, and an intake air flow amount. The control portion 30 controls the electric operating portion 12 to be able to accurately control the opening rate of the EGR valve 11. The control portion 30 uses the MAP sensor value to calculate the flow rate of the EGR (exhaust gas recirculation) and controls the ignition timing and fuel injection amount of the engine.

The control portion 30 controls the EGR module in a fuel cut state of the engine to control the flow rate of the exhaust gas that is supplied from the exhaust manifold to the intake manifold by stages, monitors the value (hereinafter, MAP sensor value) that is measured by the MAP sensor 20, and diagnoses whether the EGR module is defective or not. That is, the control portion 30 steadily controls the air flow amount during the fuel cut state, opens the EGR valve 11 in stages, and monitors the MAP sensor value depending on the opening rate of the EGR valve 11 to diagnose whether the EGR valve is defective or not.

Hereinafter, with reference to FIGS. 2 to 4, an exhaust gas recirculation diagnosis method that monitors the variation amount of the MAP sensor value according to the opening rate of the EGR valve 11 in the fuel cut state and diagnoses the fault of the EGR module will be described.

Figure 2:
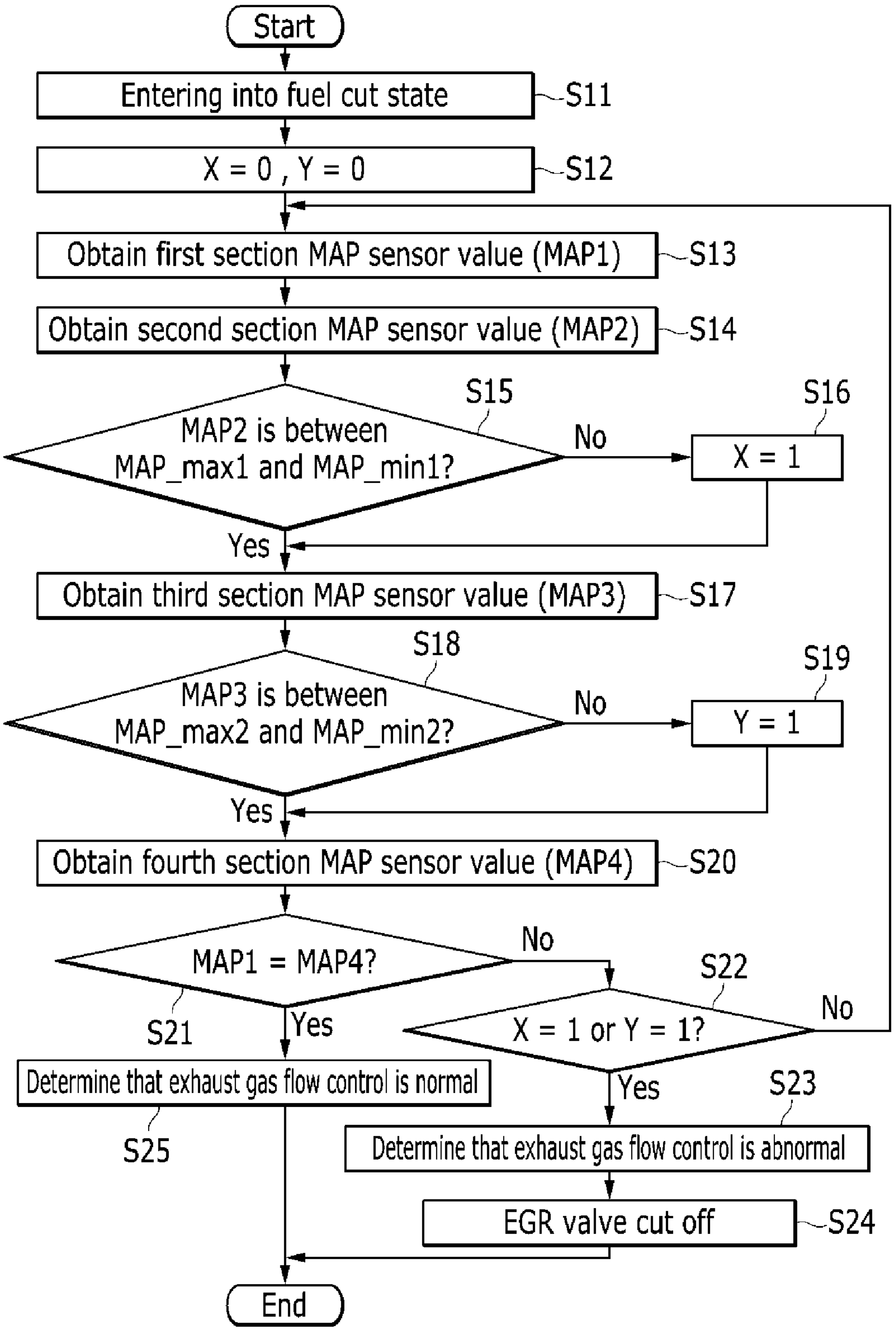
FIG. 2 is a flowchart showing an exemplary exhaust gas recirculation diagnosis method according to the present invention.

FIG. 2 is a flowchart showing an exhaust gas recirculation diagnosis method according to various embodiments of the present invention.

Figure 3:
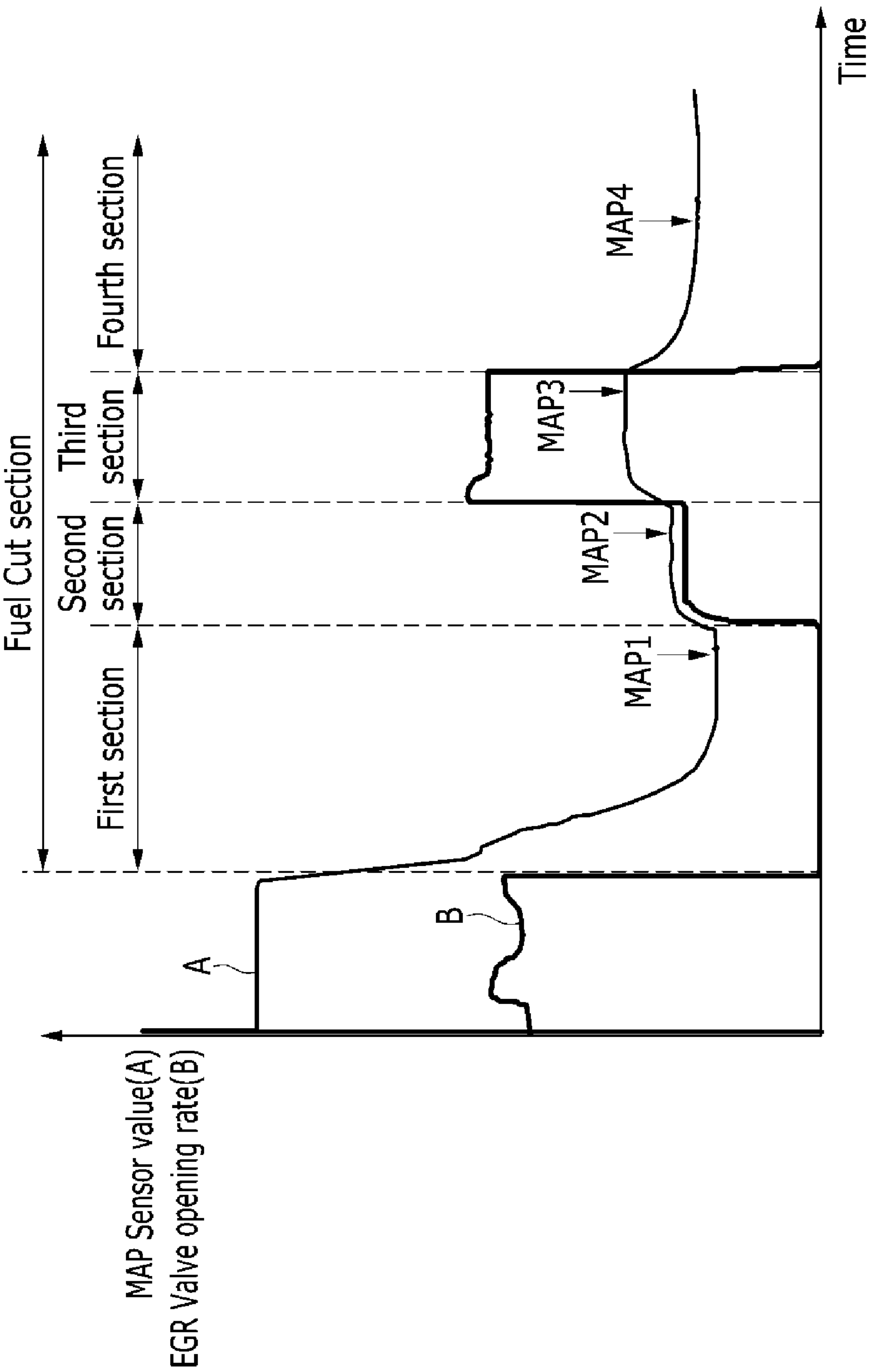
FIG. 3 is an exemplary graph showing an EGR valve opening rate and a MAP sensor value in a fuel cut off state according to the present invention.

FIG. 3 is a graph showing an EGR valve opening rate and a MAP sensor value in a fuel cut off state according to various embodiments of the present invention.

Figure 4:
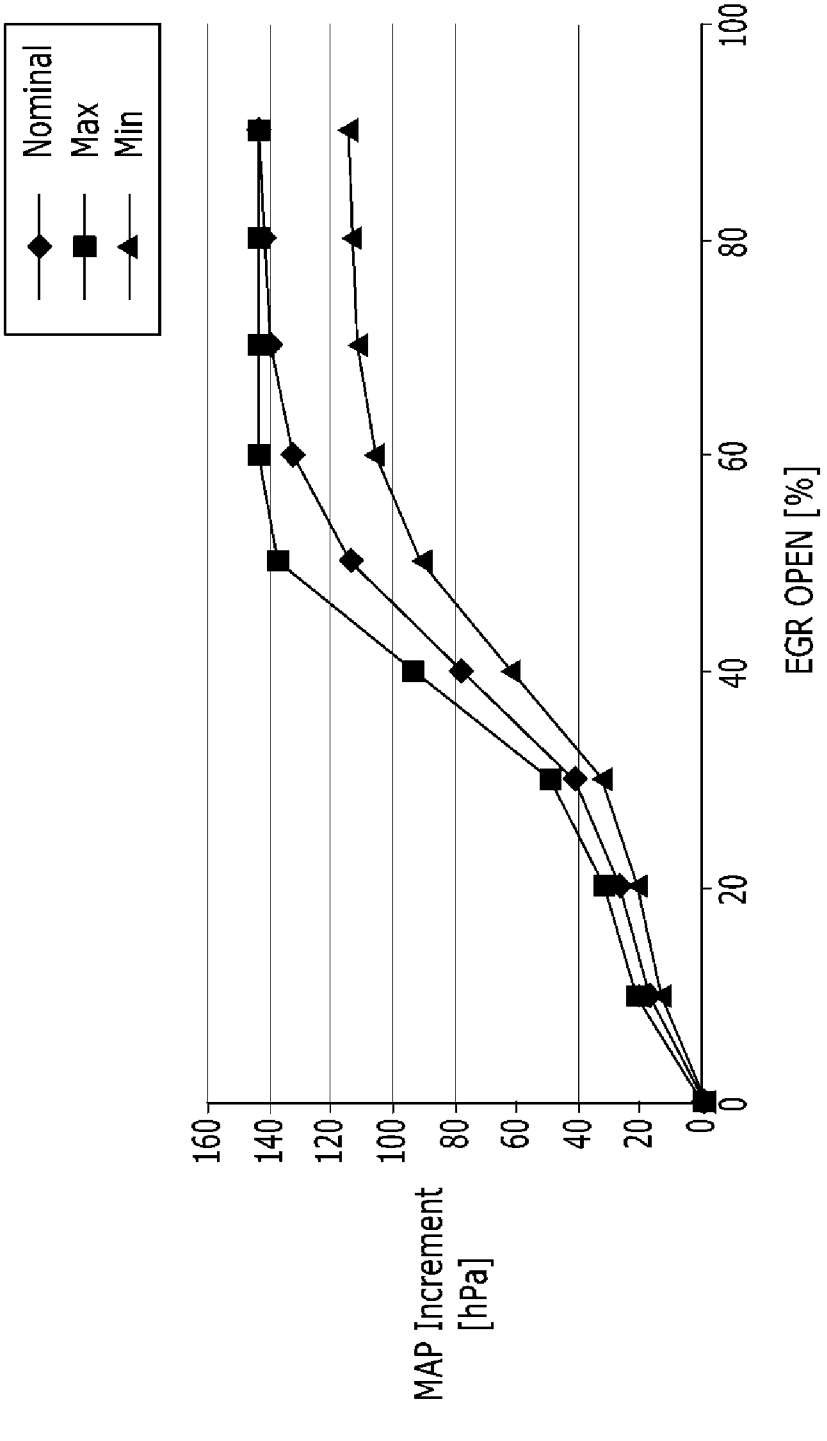
FIG. 4 is an exemplary graph showing increment and decrement of a MAP sensor value depending on an opening rate of an EGR valve according to the present invention.

FIG. 4 is a graph showing increment and decrement of a MAP sensor value depending on an opening rate of an EGR valve according to various embodiments of the present invention.

Referring to FIGS. 2 to 4, if the driver does not operate an accelerator pedal while the vehicle is running, the engine enters into a fuel cut section in which the fuel is not injected (S11). In a case that the driver uses engine as a brake while running downhill or so as to reduce the speed while the vehicle is running, because the engine is rotated by a gravity or inertia force, the fuel is not necessary, and during that time the control portion 30 steadily maintains the air amount and cuts off the fuel supplied to the engine.

As shown in FIG. 3, if the engine enters into the fuel cut state, the opening rate (B) of the EGR valve 11 becomes 0%. That is, the control portion 30 closes the EGR valve 11 during the first section. Because the EGR valve 11 is closed, the MAP sensor value (A) indicating the absolute pressure of the intake manifold is gradually lowered.

The control portion 30 sets X and Y to 0 (S12). The X and Y are parameters for diagnosing the exhaust gas recirculation.

The control portion 30 obtains a first MAP sensor value MAP1 in the first section (S13). Because the EGR valve 11 is closed in the first section, the MAP sensor value (A) is gradually lowered, and the control portion 30 can obtain the first MAP sensor value MAP1 at the moment when the MAP sensor value (A) becomes steady at an end portion of the first section.

The control portion 30 opens the EGR valve 11 to a first point in a second section, and obtains a second MAP sensor value MAP2 in the second section (S14). For example, the control portion 30 opens the EGR valve 11 to the first point such that the opening rate (B) of the EGR valve 11 becomes 5%. As shown in FIG. 3, when the opening rate (B) of the EGR valve 11 is increased, the MAP sensor value (A) is also increased. The control portion 30 can obtain the second MAP sensor value MAP2 at a part when the MAP sensor value (A) becomes steady.

The control portion 30 determines whether the second MAP sensor value MAP2 is between a maximum MAP sensor value (MAP_max1) and a minimum MAP sensor value (MAP_min1) according to the opening rate (B) of the EGR valve 11 during the first point (S15).

The maximum MAP sensor value and the minimum MAP sensor value according to the opening rate of the EGR valve can be obtained from experiments. FIG. 4 is an example in which a nominal MAP sensor value (Nominal), a maximum MAP sensor value (Max), and a minimum MAP sensor value (Min) are obtained on an experimental basis according to the opening rate (EGR OPEN) of the EGR valve. In a condition that the EGR valve is opened by the opening rate of the EGR valve, a MAP sensor value that is obtained when the exhaust gas is supplied to the intake manifold at a maximum is a maximum MAP sensor value and a MAP sensor value that is obtained when the exhaust gas is supplied to the intake manifold at a minimum is a minimum MAP sensor value. As shown in FIG. 4, while the opening rate (EGR OPEN) of the EGR valve is increased, the MAP sensor value is increased, wherein a nominal MAP sensor value (Nominal) varies between the maximum MAP sensor value (Max) and the minimum MAP sensor value (Min).

That is, in a condition that the EGR module is normally operated, the MAP sensor value that is measure by the MAP sensor 20 is to be varied within a normal range between the maximum MAP sensor value and the minimum MAP sensor value.

In a condition that the second MAP sensor value MAP2 is not included between the maximum MAP sensor value (MAP_max1) and the minimum MAP sensor value (MAP_min1), the control portion 30 sets X to 1 (S16).

The control portion 30 opens the EGR valve 11 to a second point during a third section to obtain a third MAP sensor value MAP3 from the third section (S17). For example, the control portion 30 opens the EGR valve 11 to a second point such that the opening rate (B) of the EGR valve 11 becomes 10%. As shown in FIG. 3, if the opening rate (B) of the EGR valve 11 is increased during the third section, the MAP sensor value (A) is also increased. The control portion 30 obtains the third MAP sensor value MAP3 in a portion when the MAP sensor value (A) becomes steady.

The control portion 30 determines whether the third MAP sensor value MAP3 is between the maximum MAP sensor value (MAP_max2) and the minimum MAP sensor value (MAP_min2) in an opening rate (B) of the EGR valve 11 of the second point (S18). That is, the control portion 30 determines whether the third MAP sensor value MAP3 is in a normal range.

If the third MAP sensor value MAP3 is not a value between the maximum MAP sensor value (MAP_max2) and the minimum MAP sensor value (MAP_min2), the control portion 30 sets Y to 1 (S19).

The control portion 30 closes the EGR valve 11 in a fourth section and obtains a fourth MAP sensor value MAP4 in the fourth section (S20). As shown in FIG. 3, the control portion 30 can obtain the fourth MAP sensor value MAP4 in a portion where the MAP sensor value (A) becomes steady during the fourth section.

The control portion 30 determines whether the first MAP sensor value MAP1 is equal to the fourth MAP sensor value MAP4 (S21). Because the first MAP sensor value MAP1 and the fourth MAP sensor value MAP4 are values that are measured in a condition that the ERG valve 11 is closed, they are to be equal values while the EGR module is normally operated.

If the first MAP sensor value MAP1 and the fourth MAP sensor value MAP4 are not equal, the control portion 30 determines whether at least one of X and Y is 1 or not (S22). When the second sensor value MAP2 is not in the normal range in the second section, X=1, and when the third sensor value MAP3 is not in the normal range in the third section, Y=1, and therefore if at least one of X and Y is 1, it signifies that the EGR module is abnormally operated.

If at least one of X and Y is not 1 (X=0 and Y=0), the control portion 30 operates again from S13 that obtains the first MAP sensor value MAP 1 in the first section.

The control portion 30 thereby determines that the exhaust gas flow control is abnormally operated by the EGR module (S23). That is, the control portion 30 diagnoses that the exhaust gas recirculation function is not normally operated by the fault of the EGR module.

The control portion 30 closes the EGR valve 11 if it is determined that the EGR module is defective (S24). If the EGR module is broken down in a condition that the EGR valve 11 is opened, engine output is deteriorated and engine surging can be generated. At this moment, the control portion 30 turns on a warning lamp of an instrument panel indicating the fault of the EGR module to inform a driver of the fault of the EGR module.

That is, the control portion 30 may determine that the EGR module is broken down if the first MAP sensor value MAP1 is not equal to the fourth MAP sensor value MAP4 and at least one of the second MAP sensor value MAP2 and the third MAP sensor value MAP3 exceeds a normal range.

Meanwhile, if the first MAP sensor value MAP 1 and the fourth MAP sensor value MAP4 are equal, the control portion 30 determines that the exhaust gas flow control is normally operated by the EGR module (S25).

Thus, the MAP sensor 20 that is disposed near the intake manifold is used to diagnose the fault of the EGR module while the exhaust gas recirculation is being operated. Also, it is not necessary to prepare a separate MAF (mass air flow) sensor for diagnosing the fault of the EGR module and the cost may be saved.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An exhaust as recirculation diagnosis device, comprising:
- an EGR module that supplies an intake manifold with exhaust gas from an exhaust manifold;
- a manifold absolute pressure (MAP) sensor that measures pressure of the intake manifold; and
- a control portion that controls the EGR module such that the flow rate of the exhaust gas that is supplied from the exhaust manifold to the intake manifold is controlled by stages and monitors the value of the MAP sensor in a fuel cut off condition to diagnose whether the EGR module is faulty;
- wherein the EGR module includes:
  - an EGR pipe that connects the exhaust manifold with the intake manifold;
  - an EGR valve that is disposed on the EGR pipe to control the flow rate of the exhaust gas that is supplied to the intake manifold from the exhaust manifold; and
  - an operating portion that is controlled by the control portion to operate the EGR valve; and
- wherein the control portion obtains a first MAP sensor value in a first section where the EGR valve is closed, obtains a second MAP sensor value in a second section where the EGR valve is opened until a first point, obtains a third MAP sensor value in a third section where the EGR valve is opened until a second point, and obtains a fourth MAP sensor value in a fourth section where the EGR valve is closed.

2. The exhaust gas recirculation diagnosis device of claim 1, wherein the control portion determines that an exhaust gas flow is normally controlled by the EGR module if the first MAP sensor value is equal to the fourth MAP sensor value.

3. The exhaust gas recirculation diagnosis device of claim 1, wherein the control portion determines that an exhaust gas flow is abnormally controlled by the EGR module if the first MAP sensor value is not equal to the second MAP sensor value and at least one of the second MAP sensor value and the third MAP sensor value exceeds a predetermined normal range.

4. The exhaust gas recirculation diagnosis device of claim 3, wherein the control portion shuts off the EGR valve when it is determined that exhaust gas is abnormally controlled by the EGR module.

5. An exhaust gas recirculation diagnosis method, comprising:
- closing an EGR valve during a fuel cut off condition and obtaining a MAP sensor value MAP1 indicating pressure of an intake manifold;
- opening the EGR valve to a first point and obtaining a MAP sensor value MAP2 indicating pressure of the intake manifold;
- closing the EGR valve and obtaining a MAP sensor value MAP4 indicating pressure of the intake manifold;
- comparing the MAP sensor value MAP1 with the MAP sensor value MAP4 and determining whether the EGR valve normally controls exhaust gas recirculation; and
- determining whether the MAP sensor value MAP2 is between a maximum MAP sensor value and a minimum MAP sensor value according to an opening rate of the EGR valve that is opened to the first point.

6. The exhaust gas recirculation diagnosis method of claim 5, further comprising
- opening the EGR valve to a second point and obtaining a MAP sensor value MAP3 indicating pressure of the intake manifold.

7. The exhaust gas recirculation diagnosis method of claim 6, further comprising
- determining whether the MAP sensor value MAP3 is between a maximum MAP sensor value and a minimum MAP sensor value according to the opening rate of the EGR valve that is opened to the second point.

8. The exhaust gas recirculation diagnosis method of claim 7, wherein the determining whether the EGR valve normally controls exhaust gas recirculation includes
- determining that the EGR valve normally controls the exhaust gas recirculation if the MAP sensor value MAP1 is equal to the MAP sensor value MAP2.

9. The exhaust gas recirculation diagnosis method of claim 7, wherein the determining whether the EGR valve normally controls exhaust gas recirculation includes
- determining that the EGR valve abnormally controls the exhaust gas recirculation if the MAP sensor value MAP1 is not equal to the MAP sensor value MAP2 and at least one of the MAP sensor value MAP2 and the MAP sensor value MAP3 exceeds a maximum MAP sensor value or a minimum MAP sensor value.

10. The exhaust gas recirculation diagnosis method of claim 9, further comprising
- closing the EGR valve if it is determined that the EGR valve abnormally controls the exhaust gas recirculation.

* * * * *